US012794235B2

(12) United States Patent
Friesen et al.

(10) Patent No.: US 12,794,235 B2
(45) Date of Patent: *Nov. 10, 2026

(54) CONTROL, MANAGEMENT AND DISTRIBUTION OF POWER SUPPLIED BY AN ELECTRIC UTILITY AND BATTERY ENERGY STORAGE SYSTEM

(71) Applicant: One Three Energy, Inc., Cincinnati, OH (US)

(72) Inventors: Dale Friesen, Winnipeg (CA); Keith Teichmann, Newton Centre, MA (US)

(73) Assignee: One Three Energy, Inc., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/074,952

(22) Filed: Mar. 10, 2025

(65) Prior Publication Data

US 2025/0286380 A1 Sep. 11, 2025

Related U.S. Application Data

(60) Provisional application No. 63/563,450, filed on Mar. 10, 2024.

(51) Int. Cl.
*H02J 3/32* (2026.01)
*B60L 53/10* (2019.01)
(Continued)

(52) U.S. Cl.
CPC ................ *H02J 3/32* (2013.01); *B60L 53/11* (2019.02); *B60L 53/53* (2019.02); *B60L 53/64* (2019.02); *H02J 3/12* (2013.01)

(58) Field of Classification Search
CPC ..... H02J 3/32; H02J 3/12; B60L 53/11; B60L 53/53; B60L 53/64; B60L 53/63; Y02T 10/70; Y02T 10/7072
See application file for complete search history.

(56) References Cited

U.S. PATENT DOCUMENTS

| | | | |
|---|---|---|---|
| 3,673,480 | A | 6/1972 | Johnstone |
| 3,809,980 | A | 5/1974 | Nottingham, Jr. |

(Continued)

FOREIGN PATENT DOCUMENTS

| | | | |
|---|---|---|---|
| CA | 2358418 | C | 11/2008 |
| CA | 2795737 | A1 | 5/2013 |

(Continued)

OTHER PUBLICATIONS

PCT/US2024/039299, International Search Report and Written Opinion, Oct. 11, 2024.

(Continued)

*Primary Examiner* — Menatoallah Youssef
*Assistant Examiner* — Michael J Warmflash
(74) *Attorney, Agent, or Firm* — Wood Herron & Evans LLP

(57) ABSTRACT

An energy management system providing logical control of the flow of energy between an electrical utility, Battery Energy Storage System and a load such as an electrical vehicle that is being recharged via direct current fast charging. Power is selectively delivered to the Battery Energy Storage System (i.e. charging) or from the Battery Energy Storage System (i.e. discharging), to a rapid DC charging station. The Battery Energy Storage System thus provides added capability to increase the overall output available from the utility, enabling charge rates that exceed the output capacity of the utility supply.

7 Claims, 7 Drawing Sheets

(51) Int. Cl.
*B60L 53/53* (2019.01)
*B60L 53/64* (2019.01)
*H02J 3/12* (2026.01)

(56) References Cited

U.S. PATENT DOCUMENTS

| | | | | |
|---|---|---|---|---|
| 3,931,535 | A | 1/1976 | Roesel, Jr. | |
| 4,079,446 | A | 3/1978 | Hertz | |
| 4,158,225 | A | 6/1979 | Hertz | |
| 4,168,459 | A | 9/1979 | Roesel, Jr. | |
| 4,227,136 | A | 10/1980 | Roesel, Jr. | |
| 4,249,237 | A | 2/1981 | Ronk et al. | |
| 4,406,950 | A | 9/1983 | Roesel, Jr. | |
| 4,412,170 | A | 10/1983 | Roesel, Jr. | |
| 4,600,873 | A | 7/1986 | Roesel, Jr. et al. | |
| 4,663,536 | A | 5/1987 | Roesel, Jr. et al. | |
| 4,837,671 | A | 6/1989 | Wild et al. | |
| 4,906,876 | A | 3/1990 | Landseadel | |
| 5,202,617 | A | 4/1993 | Nor | |
| 5,570,279 | A | 10/1996 | Venkataramanan | |
| 5,587,892 | A | 12/1996 | Barrett | |
| 5,594,318 | A | 1/1997 | Nor et al. | |
| 5,642,270 | A | 6/1997 | Green et al. | |
| 5,668,707 | A | 9/1997 | Barrett | |
| 5,803,215 | A | 9/1998 | Henze et al. | |
| 5,838,085 | A | 11/1998 | Roesel, Jr. et al. | |
| 5,990,590 | A | 11/1999 | Roesel, Jr. et al. | |
| 6,297,971 | B1 | 10/2001 | Meiners | |
| 6,731,525 | B2 | 5/2004 | Meiners | |
| 6,751,842 | B2 | 6/2004 | Roesel, Jr. et al. | |
| 6,972,611 | B1 | 12/2005 | Thalheim | |
| 7,768,337 | B2 | 8/2010 | Bayerer | |
| 8,106,535 | B2 | 1/2012 | Nishimura | |
| 8,384,365 | B2 | 2/2013 | Maksimovic et al. | |
| 8,509,976 | B2 | 8/2013 | Kempton | |
| 8,514,601 | B2 | 8/2013 | Alexander | |
| 8,698,354 | B2 | 4/2014 | Ghosh et al. | |
| 8,855,840 | B2 | 10/2014 | Fleming et al. | |
| 8,941,340 | B2 | 1/2015 | Meiners et al. | |
| 8,975,866 | B2 | 3/2015 | McGrath et al. | |
| 9,013,143 | B2 | 4/2015 | Marus et al. | |
| 9,043,038 | B2 | 5/2015 | Kempton | |
| 9,077,052 | B2 | 7/2015 | Reddy | |
| 9,083,235 | B2 | 7/2015 | Steinberg | |
| 9,118,247 | B2 | 8/2015 | Alexander | |
| 9,168,838 | B2 | 10/2015 | Kuribayashi et al. | |
| 9,209,698 | B2 | 12/2015 | Masuda et al. | |
| 9,428,076 | B2 | 8/2016 | Fleming et al. | |
| 9,431,888 | B1 | 8/2016 | Alexander | |
| 9,450,482 | B2 | 9/2016 | Drummond et al. | |
| 9,484,844 | B1 | 11/2016 | Floreancig | |
| 9,555,715 | B2 | 1/2017 | Sugano | |
| 9,660,460 | B2 | 5/2017 | Bishop et al. | |
| 9,754,300 | B2 | 9/2017 | Kempton et al. | |
| 9,871,462 | B2 | 1/2018 | Medagam et al. | |
| 9,893,640 | B2 | 2/2018 | Steinberg | |
| 9,914,365 | B2 | 3/2018 | King et al. | |
| 10,000,136 | B2 | 6/2018 | Jang et al. | |
| 10,017,068 | B2 | 7/2018 | McGrath et al. | |
| 10,333,420 | B2 | 6/2019 | Medagam et al. | |
| 10,377,259 | B2 | 8/2019 | King et al. | |
| 10,483,770 | B2 | 11/2019 | Cun | |
| 10,543,755 | B2 | 1/2020 | King et al. | |
| 10,771,001 | B2 | 9/2020 | Smolenaers | |
| 10,836,275 | B2 | 11/2020 | Zhu | |
| 10,857,899 | B1 | 12/2020 | McNamara et al. | |
| 10,931,205 | B2 | 2/2021 | Medagam et al. | |
| 10,946,763 | B2 | 3/2021 | McGrath et al. | |
| 10,981,458 | B2 | 4/2021 | Xu | |
| 10,994,628 | B2 | 5/2021 | Heyne et al. | |
| 11,052,782 | B1 | 7/2021 | Lemberg et al. | |
| 11,196,283 | B2 | 12/2021 | Gerrits | |
| 11,208,003 | B2 | 12/2021 | Heyne et al. | |
| 11,322,968 | B2 | 5/2022 | Ruppert | |
| 11,368,028 | B2 | 6/2022 | Singh et al. | |
| 11,400,820 | B2 | 8/2022 | King et al. | |
| 11,479,139 | B2 | 10/2022 | Smolenaers | |
| 11,760,224 | B1 * | 9/2023 | Dharmasiri | B60L 53/53 320/109 |
| 11,780,342 | B2 | 10/2023 | Fu et al. | |
| 11,801,761 | B2 | 10/2023 | Bouman | |
| 11,884,168 | B2 | 1/2024 | King et al. | |
| 11,894,781 | B2 | 2/2024 | Slepchenkov et al. | |
| 11,923,782 | B2 | 3/2024 | Slepchenkov et al. | |
| 11,926,236 | B2 | 3/2024 | Light-Holets et al. | |
| 12,007,450 | B2 | 6/2024 | Bourilkov et al. | |
| 12,083,913 | B2 | 9/2024 | Keister et al. | |
| 12,100,986 | B2 | 9/2024 | Nagano et al. | |
| 12,151,582 | B2 | 11/2024 | Goei | |
| 12,267,023 | B2 | 4/2025 | Medagam et al. | |
| 12,502,988 | B2 | 12/2025 | Noh et al. | |
| 2004/0070278 | A1 | 4/2004 | Divan et al. | |
| 2004/0130292 | A1 | 7/2004 | Buchanan et al. | |
| 2004/0262996 | A1 | 12/2004 | Olsen et al. | |
| 2005/0063115 | A1 | 3/2005 | Nayar et al. | |
| 2006/0250902 | A1 | 11/2006 | Bender et al. | |
| 2007/0035978 | A1 | 2/2007 | Newman | |
| 2007/0093280 | A1 | 4/2007 | McKay | |
| 2008/0310200 | A1 | 12/2008 | Maksimovic et al. | |
| 2009/0109713 | A1 | 4/2009 | Schnetzka et al. | |
| 2009/0189456 | A1 * | 7/2009 | Skutt | B60L 55/00 307/87 |
| 2009/0236916 | A1 | 9/2009 | Nishimura | |
| 2010/0020576 | A1 | 1/2010 | Falk | |
| 2010/0124087 | A1 | 5/2010 | Falk | |
| 2010/0188876 | A1 | 7/2010 | Garrity et al. | |
| 2010/0244778 | A1 | 9/2010 | Chuang et al. | |
| 2011/0115425 | A1 | 5/2011 | Olsson | |
| 2011/0141774 | A1 | 6/2011 | Kane et al. | |
| 2011/0202192 | A1 | 8/2011 | Kempton | |
| 2011/0202217 | A1 | 8/2011 | Kempton | |
| 2011/0202418 | A1 * | 8/2011 | Kempton | B60L 53/14 705/26.1 |
| 2012/0014151 | A1 | 1/2012 | Alexander | |
| 2012/0019203 | A1 | 1/2012 | Kressner | |
| 2012/0074893 | A1 | 3/2012 | Cole | |
| 2012/0187764 | A1 | 7/2012 | Rockenfeller et al. | |
| 2012/0200169 | A1 | 8/2012 | Urano | |
| 2012/0306443 | A1 | 12/2012 | Smith et al. | |
| 2013/0002197 | A1 | 1/2013 | Hernandez et al. | |
| 2013/0049677 | A1 | 2/2013 | Bouman | |
| 2013/0057211 | A1 | 3/2013 | Kuribayashi et al. | |
| 2013/0069592 | A1 | 3/2013 | Bouman | |
| 2013/0127381 | A1 | 5/2013 | Meiners et al. | |
| 2013/0134953 | A1 | 5/2013 | Shi | |
| 2013/0175990 | A1 | 7/2013 | Jung et al. | |
| 2013/0179061 | A1 * | 7/2013 | Gadh | B60L 53/30 701/1 |
| 2013/0229153 | A1 | 9/2013 | Sarkar et al. | |
| 2013/0234664 | A1 | 9/2013 | Marus et al. | |
| 2013/0234686 | A1 | 9/2013 | Grant et al. | |
| 2013/0257146 | A1 | 10/2013 | Nojima et al. | |
| 2013/0314039 | A1 | 11/2013 | Weber et al. | |
| 2014/0029320 | A1 | 1/2014 | Alexander | |
| 2014/0058577 | A1 | 2/2014 | Erhart et al. | |
| 2014/0070617 | A1 * | 3/2014 | Detmers | H02J 13/12 307/64 |
| 2014/0088781 | A1 | 3/2014 | Kearns et al. | |
| 2014/0159650 | A1 | 6/2014 | Beauregard | |
| 2014/0207319 | A1 | 7/2014 | King et al. | |
| 2015/0025730 | A1 | 1/2015 | Fleming et al. | |
| 2015/0061569 | A1 | 3/2015 | Alexander et al. | |
| 2015/0137751 | A1 | 5/2015 | King et al. | |
| 2015/0155715 | A1 | 6/2015 | Kobayashi | |
| 2015/0328999 | A1 * | 11/2015 | Dureau | B60L 50/51 320/109 |
| 2015/0367740 | A1 | 12/2015 | McGrath et al. | |
| 2015/0375627 | A1 | 12/2015 | Weber et al. | |
| 2016/0036314 | A1 | 2/2016 | Koyanagi et al. | |
| 2016/0039303 | A1 | 2/2016 | Kuribayashi et al. | |
| 2016/0079846 | A1 | 3/2016 | Drummond et al. | |
| 2016/0096437 | A1 | 4/2016 | Tripathi et al. | |
| 2016/0308472 | A1 | 10/2016 | Floreancig | |
| 2017/0001528 | A1 | 1/2017 | King et al. | |

(56) References Cited

U.S. PATENT DOCUMENTS

2017/0129348 A1 5/2017 Jang et al.
2017/0170743 A1* 6/2017 Medagam ........... H02M 5/4585
2017/0214245 A1* 7/2017 Nazarian ................. B60L 50/52
2017/0229918 A1 8/2017 Madawala et al.
2017/0320395 A1 11/2017 Vallender et al.
2018/0001773 A1 1/2018 King et al.
2018/0029545 A1 2/2018 Mohrmann et al.
2018/0029546 A1 2/2018 Mohrmann et al.
2018/0041061 A1* 2/2018 Mclaughlin ............. B60L 53/20
2018/0162228 A1 6/2018 Götz et al.
2018/0162229 A1 6/2018 Götz et al.
2018/0198282 A1 7/2018 Hunt et al.
2018/0212438 A1 7/2018 Bouman
2018/0215279 A1* 8/2018 Beekmann .............. B60L 53/11
2018/0254658 A1 9/2018 Koerner et al.
2018/0273016 A1 9/2018 Xu
2018/0278168 A1 9/2018 Brown et al.
2018/0281609 A1 10/2018 Yang et al.
2018/0290546 A1 10/2018 McGrath et al.
2018/0345807 A1 12/2018 Cun
2018/0362016 A1 12/2018 Atala et al.
2019/0028023 A1 1/2019 Eckhardt et al.
2019/0131881 A1 5/2019 Medagam et al.
2019/0168630 A1 6/2019 Mrlik et al.
2019/0176651 A1 6/2019 King et al.
2019/0241089 A1 8/2019 Heyne et al.
2019/0252991 A1 8/2019 Medagam et al.
2019/0268676 A1* 8/2019 Teichmann .............. H04Q 9/00
2019/0275894 A1 9/2019 Amacker et al.
2019/0288539 A1 9/2019 Vela Garcia
2019/0389314 A1 12/2019 Zhu
2020/0039358 A1 2/2020 Duan
2020/0062138 A1 2/2020 Smolenaers
2020/0070643 A1 3/2020 Huh et al.
2020/0076225 A1 3/2020 Naylor
2020/0114770 A1 4/2020 King et al.
2020/0160461 A1 5/2020 Kaniki
2020/0189404 A1 6/2020 Haugan et al.
2020/0235655 A1 7/2020 Hayashi
2020/0251911 A1 8/2020 Hunt et al.
2020/0269704 A1 8/2020 Duan et al.
2020/0298722 A1 9/2020 Smolenaers
2020/0321797 A1 10/2020 Gerrits
2020/0361323 A1* 11/2020 Chon ....................... B60L 50/61
2020/0377043 A1 12/2020 Pighi et al.
2020/0391682 A1 12/2020 Ganireddy et al.
2021/0036536 A1 2/2021 Ruppert
2021/0061121 A1 3/2021 Light-Holets et al.
2021/0086648 A1* 3/2021 Lin ......................... B60L 53/53
2021/0101499 A1 4/2021 Mcnamara et al.
2021/0111582 A1 4/2021 Livingston
2021/0111642 A1* 4/2021 Weyh .................... H02M 7/487
2021/0146792 A1* 5/2021 Lehn ....................... B60L 50/40
2021/0155094 A1 5/2021 Pighi et al.
2021/0221238 A1 7/2021 Duan et al.
2021/0268931 A1* 9/2021 Gupta ..................... B60L 53/11
2021/0362614 A1* 11/2021 Carr ...................... B60L 53/665
2021/0370793 A1 12/2021 Tombelli et al.
2022/0009373 A1 1/2022 Patel
2022/0045536 A1 2/2022 Nagano et al.
2022/0103088 A1 3/2022 Slepchenkov et al.
2022/0115903 A1 4/2022 Abe
2022/0161677 A1* 5/2022 Pizzurro ................. B60L 53/51
2022/0166233 A1 5/2022 Pizzurro et al.
2022/0173595 A1 6/2022 Lehn et al.
2022/0212551 A1 7/2022 Bouman
2022/0234467 A1 7/2022 Nakamura
2022/0281346 A1* 9/2022 Green ..................... B60L 53/11
2022/0291291 A1 9/2022 Bourilkov et al.
2022/0332210 A1 10/2022 Goei
2022/0355681 A1 11/2022 King et al.
2022/0402390 A1 12/2022 Smolenaers
2023/0011000 A1* 1/2023 Zhou ....................... B60L 53/11
2023/0011977 A1 1/2023 Nguyen et al.
2023/0047524 A1* 2/2023 Lehn ..................... B60L 15/007
2023/0049722 A1 2/2023 King et al.
2023/0062531 A1 3/2023 Jayachand
2023/0093417 A1 3/2023 Medagam et al.
2023/0094716 A1 3/2023 Zenner et al.
2023/0135028 A1 5/2023 Eggers et al.
2023/0145630 A1 5/2023 Chow et al.
2023/0211686 A1 7/2023 Smolenaers
2023/0221377 A1 7/2023 Bourilkov et al.
2023/0226936 A1* 7/2023 Haghbin ................. B60L 53/16
701/22
2023/0271524 A1 8/2023 Kulkarni et al.
2023/0278441 A1* 9/2023 Wilson .................... B60L 53/24
701/22
2024/0075843 A1* 3/2024 York ....................... B60L 53/68
2024/0116375 A1 4/2024 Asa et al.
2024/0157821 A1 5/2024 King et al.
2024/0166073 A1 5/2024 Light-Holets et al.
2024/0217363 A1 7/2024 Wolfe et al.
2024/0222971 A1* 7/2024 Wolfe ..................... B60L 53/30
2024/0258804 A1 8/2024 Herranz et al.
2024/0367527 A1* 11/2024 Sengebusch ............ B60L 53/22
2024/0383347 A1 11/2024 Seroff et al.
2024/0416779 A1 12/2024 Boucher et al.
2025/0010731 A1 1/2025 Vahedi et al.
2025/0023483 A1 1/2025 Slepchenkov et al.
2025/0091466 A1 3/2025 Wang et al.
2025/0091478 A1 3/2025 Jehle et al.
2025/0214853 A1 7/2025 Rizzi
2025/0253677 A1 8/2025 Stanfield et al.
2025/0286380 A1 9/2025 Friesen et al.

FOREIGN PATENT DOCUMENTS

CA 2984072 A1 6/2018
CN 100490550 C 5/2009
CN 112367566 A 2/2021
CN 113765163 A 12/2021
EP 1289111 A1 3/2003
JP WO2015008467 A1 3/2017
KR 102304469 B1 9/2021
WO 2015008467 A1 1/2015

OTHER PUBLICATIONS

PCT/US2025/019117, International Search Report dated Jul. 1, 2025.
PCT/US2025/019117, Written Opinion dated Jul. 1, 2025.
Sharma et al., "Conversion of Single Phase AC to Three Phase AC Supply", International Journal of Scientific Research in Computer Science, Engineering and Information Technology, Apr. 14, 2018, pp. 169-173.

* cited by examiner

CONTROL, MANAGEMENT AND DISTRIBUTION OF POWER SUPPLIED BY AN ELECTRIC UTILITY AND BATTERY ENERGY STORAGE SYSTEM

RELATED APPLICATIONS

This application is a non-provisional application of U.S. Provisional Application No. 63/563,450 filed Mar. 10, 2024. This application is related to U.S. patent application Ser. No. 18/179,787 filed on Mar. 7, 2023, which claims priority to U.S. Provisional Patent Application No. 63/362,551 filed on Apr. 6, 2022, as well as U.S. Provisional Patent Application No. 63/481,324 filed on Jan. 24, 2023, U.S. Provisional Patent Application No. 63/481,332 filed on Jan. 24, 2023, and U.S. Provisional Patent Application No. 63/481,342 filed on Jan. 24, 2023, the disclosures of which are incorporated by reference herein in their entireties.

TECHNICAL FIELD

The present invention pertains to the wide-spread deployment of electrical power for high power applications, such as rapid charging systems for electric vehicles.

BACKGROUND

Chargers for plug-in electric vehicles (EVs) convert AC input voltage to an appropriate DC charging voltage, which is applied to the on-board energy storage system, typically an electric vehicle battery. The AC input voltage required by the charging system is typically provided by the local utility distribution power grid, and may be provided in a single-phase, split-phase (also called single-phase) or three-phase configurations.

EVs are known for efficient use of energy and zero emission characteristics (or more accurately "zero tail pipe emissions"—since the electric energy provided to an EV may create emissions if generated from a non-renewable resource). Consequently, there is substantial societal pressure to expand the use of electric vehicles and provide for their practical use outside of higher-density urban commuting areas where rapid DC charging systems are more easily deployed due to the ready availability of three-phase utility service.

A primary hurdle to the widespread adoption of EVs relates to "range anxiety", namely the fear that an EV cannot be used for long-distance travel due to insufficient on-board energy storage (or range). While statistics show that 90-95% of all vehicle travel is well within the range of a typical commercially available EV, most consumers demand a vehicle that has the capability to travel longer distances effectively, even if such travel is rare. A secondary hurdle relates to availability of rapid charging facilities while traveling longer distances, where users may conveniently replenish the charge in their EV battery without incurring an extended charging session. This secondary concern is particularly relevant to travel in rural, or more remote settings, where access to rapid charging is compromised by constraints related to existing single-phase electric power infrastructure and its limited-service capacity.

Government funding programs are being launched to support the buildout of remote charging facilities across the country, which will allow for rapid charging of EVs when used for long distance travel. In many cases, these programs focus specifically on Level 3, rapid DC charging stations supporting 50-150 kW charge rates along Interstate routes, and ultimately, in other rural locations seeking to support electric vehicle travel. Level 3 rapid charging is important for reducing charging times to an acceptable duration of 30 minutes or less, which is broadly comparable to the time consumed for a conventional hydrocarbon refueling stop.

The societal effort to accelerate adoption of electric vehicles is often limited by the technical capabilities of the national power grid. As one example, the current capacity and structure of the distribution power grid is generally deemed to provide insufficient capacity for the delivery of energy required for charging of a national EV fleet equivalent to the current fleet of hydrocarbon-fueled vehicles. News reporting on this issue has focused upon the limited capacity of the existing and aging national electric utility infrastructure, which must be substantially improved and expanded to provide sufficient electrical capacity for delivery of required energy volumes needed for charging an ever-growing fleet of electric vehicles. However, there is a second issue that is less appreciated: Due to its higher charge rate and related electrical capacity requirements, DC fast charging requires a consistent multi-phase energy flow from the utility that is not readily available in many locations within existing infrastructure, particularly in rural or more remote locations served by commonly used single-phase infrastructure.

Furthermore, rural or more remote locations are frequently plagued by poor power quality with more frequent voltage fluctuations, surges/sags, interruptions, and lesser reliability than is common in higher-density urban settings with more robust utility networks. Long radial single-phase distribution feeders used in most rural networks are designed to serve widely-dispersed electric loads that are generally smaller in size, and therefore, often lack the electrical capacity and multi-phase configurations needed to support larger DC rapid charge stations.

Recently it has been proposed to include energy storage at DC rapid charge stations to address the lack of capacity in the utility distribution system. (i.e., inability to meet the coincidental peak power demand created by rapid DC charging stations). For example, batteries are charged by drawing lower levels of power over longer periods when the station is idle and not utilized for EV charging. The stored energy is then used to augment (or boost) the available capacity from the utility network when a charging session is activated. This approach is feasible given the lower usage factors applicable to rapid DC charging stations, particularly during nighttime and mid-day periods.

A further issue arises from the nature of single-phase distribution network used to serve many rural, or remote, locations across the United States, and other countries like Canada, Australia, etc. Specifically, many rural areas are supplied with long radial single-phase feeders rather the shorter higher capacity three-phase feeders used in higher-density urban locales where rapid DC charging stations are also located to support higher concentrations of local EV commuters. The primary advantage of single-phase power delivery relates to the cost of the utility distribution infrastructure, where for a given electrical capacity, a lower cost single or two-wire single phase distribution system requires fewer conductors and smaller structures, thus saving both conductor material and reducing required pole sizes relative to multi-phase systems.

In typical residential, agricultural, small commercial/industrial applications, higher voltage single-phase distribution power is delivered to each neighborhood (or service area) and then transformed to lower capacity 240V service for individual customers using pole-mounted single-phase center-tapped "split phase" transformers. The center tap is connected to a distribution system neutral or grounded with a short strap to the transformer case, forming a neutral terminal through the bonded ground conductor. This neutral terminal, along with the two secondary (or hot) terminals are delivered to each residence, thus providing two 120 VAC supplies with respect to the neutral, which are 180 degrees out of phase with each other and therefore capable of providing a 240 VAC supply for larger equipment in the serviced premise. Circuits for lighting and small appliance power outlets (ie. NEMA 1 and NEMA 5) typically use 120 V circuits connected between one of the 120 V hot lines and neutral protected by a single-pole circuit breaker. Higher-demand applications, such as air conditioners, are often powered using 240 V AC circuits connected between the two 120 V AC lines. These 240 V AC loads are protected by two-pole circuit breakers and are either hard-wired or use NEMA 10 or NEMA 14 outlets which are deliberately incompatible with the 120 V AC outlets.

Higher capacity utility networks supplying power to more densely populated centers with larger commercial and industrial areas typically use three-phase transformer banks that reduce the higher three-phase distribution voltage to three 120-degree spaced phases measuring 277 Volts AC from line to neutral and 480 Volts AC from line to line (other wye and delta configurations are also available to provide 240 or 208 V (AC line to line) three-phase power without a reference neutral conductor). The three electrical phases may be delivered in a four wire "Wye" (Y) configuration, providing a neutral and three phases P1, P2 and P3, or three wire "Delta" configuration, delivering three phases P1, P2 and P3, without a neutral. Delta configurations not only require fewer wires (lower conductor costs), but also have a degree of fault tolerance, as a single winding failure at the source will not interrupt power delivery to customers.

Residential, agricultural and smaller commercial/industrial areas in less densely populated areas are often served with single-phase utility distribution systems, providing two-wire single-phase service either 240 Vac or 480 Vac single-phase configurations. 240 Vac single-phase services are typically used to provide 120/240 V service for general household and small commercial/industrial businesses, while 240/480 Vac single-phase services may be used to provide higher capacity single-phase service for higher power applications such as single-phase AC electric motors used with pumps or air handlers, and for other applications, such as electric heating.

Due to the heavy electrical demand of rapid DC charging systems (as much or more than 150 KW), it is common for such chargers to be supplied with three phase, 480 Vac power (Delta or Wye) as is typically delivered from three-phase utility transformers serving commercial/industrial areas. This configuration is generally preferred because three phase power can be rectified into a low-ripple DC voltage suitable for vehicle charging because the three phases provide peak voltage six times per AC cycle rather than only twice as is the case with single phase power. Furthermore, three phase power reduces the current carrying capacity in each supply conductor by providing three wires to share the larger current draw needed to support the power requirements of a rapid DC charging system. Unfortunately, many areas, including rural and agricultural regions, smaller communities, highway rest stops, and lighter commercial/industrial areas, are often supplied using single phase utility distribution systems that provide service in 240 or 480 Vac single-phase configurations. As a result, three-phase 480 Vac electric power is often not readily available. Providing three-phase service can be cost-prohibitive, as it often requires miles of new three-phase distribution infrastructure to provide service at locations where a rapid DC charging system may be desired for charging electric vehicles.

What is therefore needed, is supporting infrastructure enabling the use of rapid DC charging systems with common utility supplies of 480 Vac single-phase power that is readily available in most locations. Furthermore, there is a need to provide such a system with energy storage to enable the system to overcome the challenges inherent with restricted capacity and inconsistent power delivery in those same locations.

SUMMARY OF THE INVENTION

In one aspect, the present invention features an energy management system (EMS) providing logical control algorithmically controlling the flow of energy between an electrical utility, Battery Energy Storage System (BESS) and a load such as an electrical vehicle that is being recharged via direct current fast charging (DCFC). While the principles of the invention are explained herein in the context of the supply of power for DCFC, it will be understood that the electrical load may be any other form of load not limited to DCFC loads.

Under control of the EMS, the Battery Energy Storage System and a utility selectively deliver power to the Battery Energy Storage System (i.e. charging) or from the Battery Energy Storage System (i.e. discharging), to a rapid DC charging station. The Battery Energy Storage System thus can provide added capability to increase the overall output available from the utility, enabling charge rates that exceed the output capacity of the utility supply.

In more complex embodiments, the EMS may control the high-capacity energy storage to reduce the demand on the utility supply in response to a utility signal (request) for demand curtailment or demand response. The response facilitated by the EMS decreases the load on the converter by drawing additional power from the high-capacity energy storage device, and thereby reducing the power demand on the utility.

In a further embodiment, the Battery Energy Storage System may be used to provide energy to the charging station during a utility power failure or other power quality event that compromises the availability of the utility supply. When used as a keep-alive device, the EMS causes stored energy to be drawn from the Battery Energy Storage System to maintain operation of the electric vehicle rapid DC charging system during a utility outage or interruption.

In a more detailed embodiment, the EMS may suspend operation of an electric vehicle charging station and interrupt charging of vehicles by the charging station if stored energy levels are drawn down but maintain the communication and status monitoring functionality of the electric vehicle charging station during the utility power interruption.

In other embodiments, the EMS may be coupled to a wireless monitoring and control system that is in communication with a remote computing device for monitoring and control of the multi-phase power supply provided by the invention. This embodiment may co-exist with other embodiments and provide varying levels of monitoring and control for the system.

In further embodiments, the EMS is coupled to a vehicle detector and activates the Battery Energy Storage System, and a transfer switch if used, to deliver power to the charging station when a vehicle is detected at the charging station. In a more detailed embodiment, the controller determines whether the utility or Battery Energy Storage System are ready to provide electrical power to the rapid charging station, and in response controls the output and transfer switch required in some embodiments to selectively deliver power from the utility and/or Battery Energy Storage System to the rapid charging station used for electric vehicle charging.

In accordance with principles of the present invention, the Battery Energy Storage System and EMS can support individual loads with different, unique, and variable charging load profiles. This is accomplished by bi-direction communication between the EMS and the utility power source, Battery Energy Storage System, and individual loads, to establish a command-and-control structure whereby individual loads will take direction and take consequential action(s) based upon the direction of the EMS. Communications may be wired or wireless, on-site or remote via a direct or cloud-based connection. The command-and-control structure may be administered via rules-based-coding, machine learning, artificial intelligence, block-chain distributed systems, or a combination of all.

Any of these described embodiments may be enhanced through direct communication with the rapid DC charging station, enhancing the capability of the system controller and various embodiments to respond to the requirements of the rapid charging station.

BRIEF DESCRIPTION OF THE DRAWINGS

The accompanying drawings, which are incorporated in and constitute a part of this specification, illustrate embodiments of the invention, which together with the detailed descriptions given below, explain various aspects of the invention and its application.

FIG. 2 is a block diagram of the configuration of modules in accordance with the present invention, including the utility power source-shown as including a step-up transformer and power conditioning (phase transformation), the battery energy storage system shows as including the battery energy storage and utility power interface.

FIG. 3 is a simplified block diagram of the operation of the modules of FIG. 2 showing flow paths for supply and delivery of power, which may be utilized in several operational modes as reviewed below.

DETAILED DESCRIPTION

Figure 1A:
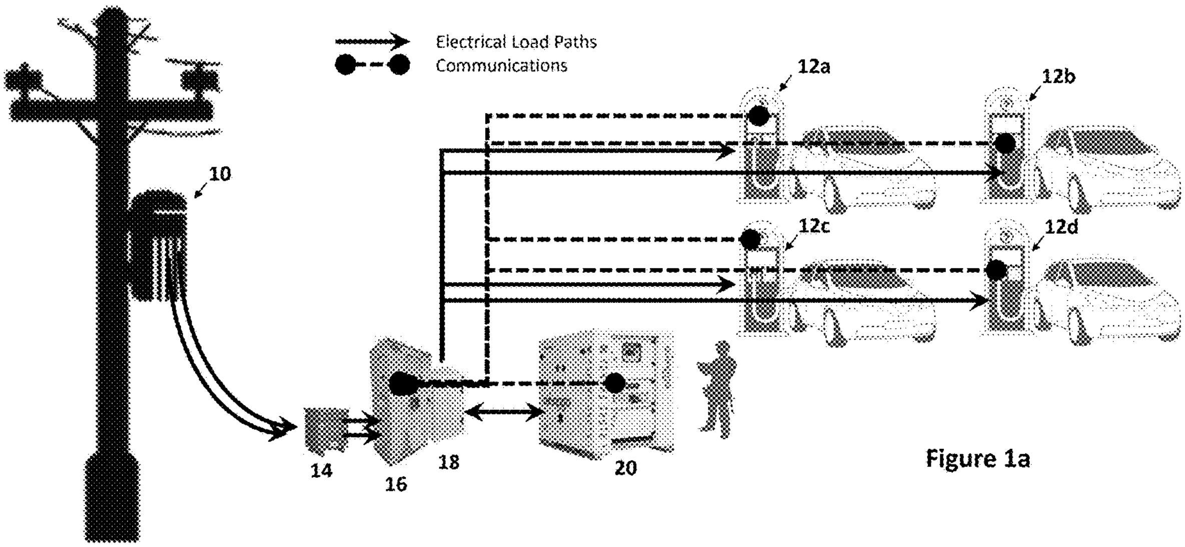
FIG. 1*a* shows an Illustrative Application for EV DC Fast Charging including the power and communications connections between DC Fast Chargers, a Battery Energy Storage System, and a Utility Power Interface.

FIG. 1*a* illustrates the key components of a typical converter configuration with various embodiments of a system for supplying electrical power to electric vehicle (EV) rapid charging stations through conversion of a single-phase utility power supply 10 to a multi-phase output (as illustrated, three-phase DC Fast Chargers 12*a*, 12*b*, 12*c* and 12*d*) via a step-up transformer 14 and phase converting conditioned utility power source 16, coupled to a utility power interface 18 and battery energy storage system 20. These embodiments utilize utility supplied single phase power, such as 480 Vac single phase power available from a utility pole 10, and produce three phase power, such as 480 Vac three phase output to drive the rapid charging stations, but other embodiments could produce two phases, four phases, or other multi-phase output power formats for powering an EV charging station with different input power requirements.

The Step-Up Transformer 14 is an optional component that can be used when the input power source is not 480 V (e.g. 208 V, 240 V, 600 V, etc.). Moreover, the Utility Power Interface 18 contains a common three-phase AC electrical bus, along with monitoring capabilities used by the energy management system to control the relative power inputs to the electrical bus, manage the bi-directional flow of energy to and from the Battery Energy Storage System 20 and manage the electric loads connected to the common bus.

Figure 1B:
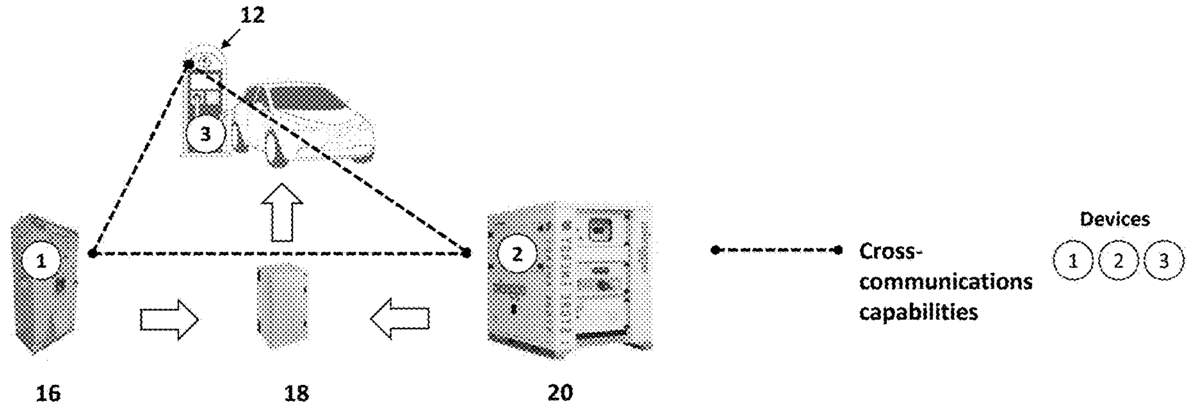
FIG. 1*b* shows the illustrative application for EV DC Fast Charging with a focus on the communications and control between the modules.

FIG. 1*b* focuses upon the communication and control capabilities of the conditioned utility power source 18, Battery Energy Storage System 20 and an exemplary DC Rapid Charger 12. These three modules communicate amongst each other and coordinate the appropriate power requirements between the three modules, as elaborated more fully below.

Specifically, the Battery Energy Storage System 20 will include an Energy Management System (EMS) for monitoring the power output of the Conditioned Utility Power Source, managing the bi-directional flow or energy to and from the Battery Energy Storage System, and managing the power requirement for the DC Fast Charge (DCFC) station 12.

The EMS will regulate the bi-direction flow of energy to/from the Battery Energy Storage System 20 supplementing the output of the Conditioned Utility Power Source 16 to support the power requirement of the DC Fast Charge (DCFC) station 12. It will also coordinate the availability of power from the Conditioned Utility Power Source 16 to replenish the Battery Energy Storage System 20 state of charge.

The Energy Management System is critical in coordinating a Power Conversion System (PCS) within the Battery Energy Storage System 20 with delivering power from its Battery Rack to the DC Fast Charge (DCFC) Station 12 and providing power from the Conditioned Utility Power Source 16 back to the Battery Rack of the Battery Energy Storage System 20 for recharging of its batteries.

The Energy Management Systems is also necessary for derating the DC Fast Charge (DCFC) Station 12 when the Battery Energy Storage System 20 becomes depleted. The essential role of the Energy Management System is to maintain balance and synergy between the Conditioned Utility Power Source 16, DC Fast Charge (DCFC) station 12, and Battery Energy Storage System 20.

The Energy Management System is an integral part of the package and will be physically located within the Battery Energy Storage System 20 along with the Power Conversion System, Battery Rack, and associated cooling, fire suppression, batter elements, and other system architectural elements.

The Energy Management System will require the appropriate software algorithms, device firmware, and supporting network protocols to supply the "cross-communications" and control capabilities illustrated below.

FIGS. 1*c*-1, 1*c*-2 and 1*c*-3 illustrate multiple use cases for the modules discussed above. As can be seen in these three figures, the Battery Energy Storage System 20 is not directly connected to the single-phase utility service (power source). The Battery Energy Storage System 20, rather, compliments the Conditioned Utility Power Source 16 supplying power through the Utility Power Interface 18 when additional power is required to support the load demands, and drawing power when the Conditioned Utility Power Source is available to replenish the Battery Energy Storage System state of charge.

Figures 1, 1C:
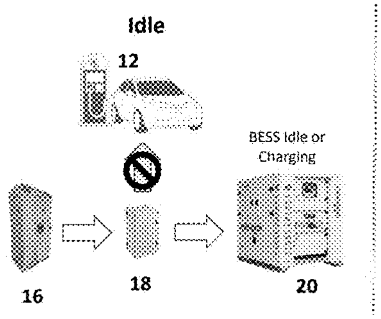
FIGS. 1*c*-1, 1*c*-2 and 1*c*-3 show illustrative use cases for EV DC charging when the Battery Energy Storage System is idle, charging from utility power, or supplementing utility power.
Figures 1, 1C, 2:
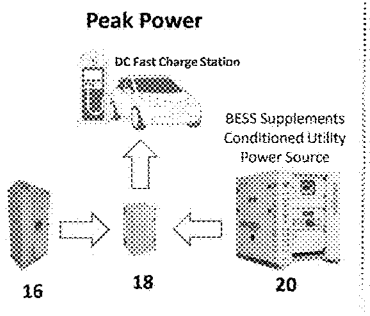

In FIG. 1*c*-1, the DC Fast Charging Station 12 is idle and the BESS 20 is idle or charging. In FIG. 1*c*-2, the DC Fast Charging Station 12 is at Peak power, and the BESS 20 is supplementing the conditioned utility power source 16. In FIG. 1*c*-3, the DC Fast Charging Station 12 is not at peak power and the BESS 20 may or may not be operating depending upon the power requirements of the DC Fast Charging Station 12 and the state of charge of the BESS 30. These are several examples of the synergistic operation of the Battery Energy Storage System 20 with the Conditioned Utility Power Source 16 to address the power requirements of the DC Fast Charge Station 12.

As noted in FIG. 1*b*, cross-communications capabilities will be necessary to coordinate the power exchange between the Conditioned Utility Power Source 16, Battery Energy Storage System 20, and DC Fast Charge Station 12.

FIG. 2 provides a simplified block diagram showing the power flow capabilities of the modules discussed above. This diagram includes a step-up transformer 14 which would be needed if available utility power is not 480V AC.

The Battery Energy Storage System 20 is not directly connected to the single-phase utility service 10 (power source), rather, the Battery Energy Storage System 20 is complimentary to the Conditioned Utility Power Source 16, supplying power through the Utility Power Interface 18 when additional power is required to support the load demands, and drawing power when the Conditioned Power Source 16 is available to replenish the BESS 20 state of charge.

The additional diagrams below which highlight several examples of the synergistic operation of the Battery Energy Storage System 20 with the Conditioned Utility Power Source 16 to address the power requirements of the DC Fast Charge Station 12.

As noted in FIG. 1*b*, cross-communications capabilities will be necessary to coordinate the power exchange between the Conditioned Utility Power Source 16, Battery Energy Storage System 20, and DC Fast Charge Station 12.

The Conditioned Utility Power Source 16 utilizes a Service-Entrance Rated Enclosure, and includes Input/Output Disconnect Switches, 1ø AC Input Overload Protection and a Power Conversion Module such as disclosed in the above-incorporated patent applications. This unit further provides 3ø AC Output Overload Protection, 3ø Feeder Overload Protection, System Controls/Power Monitors, and wireless (e.g., 4G cellular) Cloud Dashboard Reporting.

The Utility Power Interface 18 comprises a 3ø Delta/Wye Transformer, 3ø 480 V Splitter (four wire), Power Monitor(s), 3ø AC Overload Protection, 3ø Overload Protection, 3ø Feeder Protection, and optionally, individual Output Terminals and Feeder Protection for each Individual DCFC Station(s) 12.

The Battery Energy Storage System 20 comprises Energy Storage Batteries, DC Overload Protection, Bi-Directional Battery Controller(s), AC Overload Protection, an Energy Management System, Fire Suppression System, and Air Conditioning or Liquid Cooling Package.

Figures 1, 1C, 2, 3:
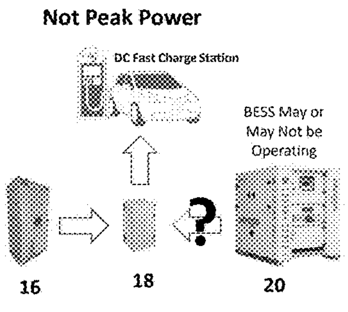
Figure 2:
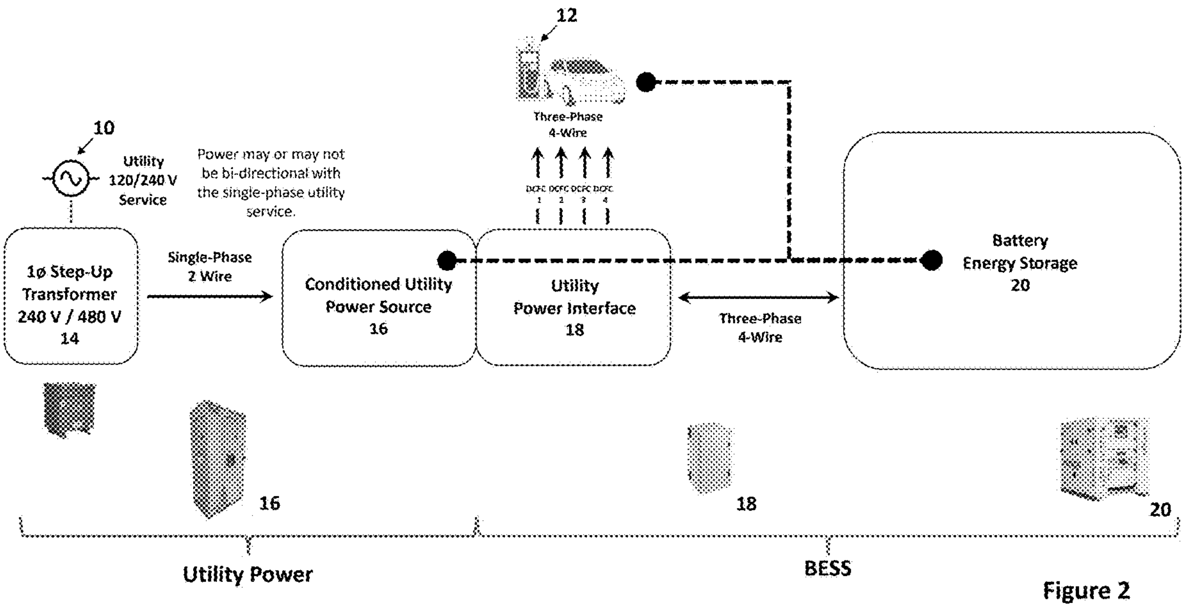

FIG. 3 is a simplified block diagram defining operational modules for the sake of the following discussion of application cases.

With respect to the application cases discussed below:

Power Supplied from Conditioned Utility Power Source 16 (e.g., from a single-phase utility service 10, through a step-up transformer 14 (if required), and approximately constant as f{time} although some variability may exist and may even be controlled through logical operators).

Power Delivered from Conditioned Utility Power Source 16+Battery Energy Storage System 20 (through Utility Power Interface 18, variable as f{time} and logically controlled through the included Energy Management System).

Power Required by Electrical Load(s) 12 (singular, multiple, any type, all operating independently, all in communication with the BESS 20 and Conditioned Utility Power Source 16, total is additive for "required," variable as f{time} and interrogated through the Energy Management System).

As explored below, coordinated control of the three primary elements—Conditioned Utility Power Source 16, Battery Energy Storage System 20 and Electrical Load 12, not only enables delivery of the required energy and power to a load, but also enables the provision of Demand Response capabilities, where the demand on the single-phase utility source could be reduced be increasing energy delivery from the BESS 20 (subject to availability) or reducing the load demand through curtailment (reduction in load demand).

In the case that the power delivered to the electrical load equals the utility power supplied, i.e., Power Supplied=Power Delivered, and the BESS 20 supplies no additional power, remains idle, and Power Required individual loads, if multiple, pull their required and associated power from the Power Delivered.

In the case that the utility power supplied is greater than the power required to be delivered to the electrical load, i.e., Power Supplied defines Power Delivered, Electrical load(s) pull the appropriate power required from Power Supplied. BESS 20 supplies no additional power, remains idle, but if the BESS 20 is not at a 80% to 100% charge, BESS 20 will extract power from Power Supplied so long as Power Supplied continues to deliver Power Required.

In the case that the power required to be delivered to the electrical load is greater than the utility power supplied, i.e., Power Supplied is less than Power Delivered, then BESS 20 supplies additional power until Power Delivered=Power Required. Power Required individual loads, if multiple, define the additive total setting the Power Delivered requirement. Power Required individual loads, if multiple, pull their required and associated power from the Power Delivered. BESS 20 continues the supply of additional power until reaching a state of 10% charge or the collective system attains the state of Power Supplied= or >Power Required. If BESS 20 attains a state of 10% charge and Power Required>Power Supplied, EMS will ask Power Required individual loads to de-rate their requirements until such time that BESS 20 attains X % charge or Power Required<Power Supplied.

In the case that no power is required to be delivered to the electrical load, i.e., Power Delivered=0, the BESS 20 supplies no power. BESS 20 remains idle, except if BESS 20 is not at a 80% to 100% charge, BESS 20 will extract power from Power Supplied so long as Power Required=0 or Power Supplied>Power Required (electrical loads engage during BESS 20 recharging, Power Delivered>0, Power Required<Power Supplied). BESS 20 continues charging until attaining a state of 80% to 100% charge or Power Required>Power Supplied.

Figure 3:
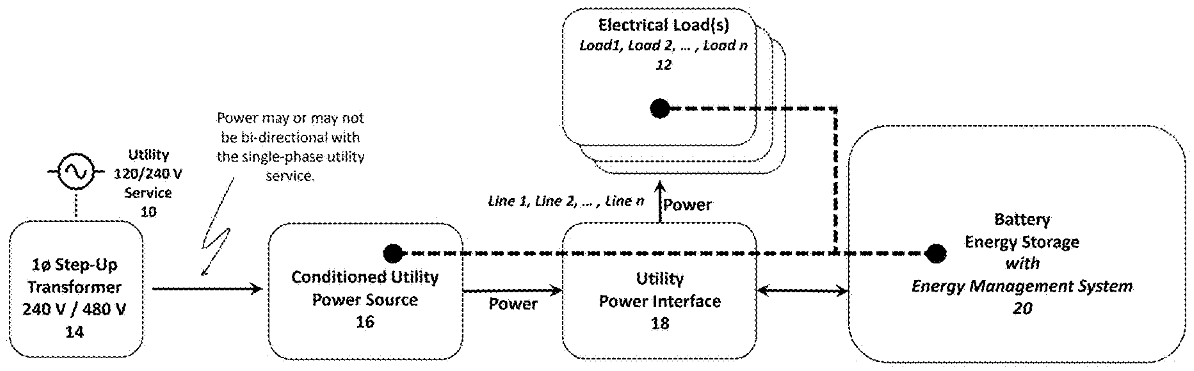
Figure 3A:
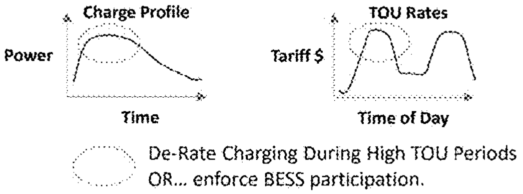
FIG. 3*a* illustrates periods of de-rated charging, or enforced BESS participation, to adapt to a time of use (TOU) local utility rate plan

FIG. 3*a* illustrates periods of de-rated charging, or enforced BESS 20 participation, to adapt to a time of use (TOU) local utility rate plan. For such scenarios, the Energy Management System programmed with local utility TOU charges, rates and/or Tariffs. Within a specific % de-rate(s) band for individual electrical load charging profiles, the EMS may instruct individual or all electrical loads, based upon their independent charging profiles, to de-rate their Power Required based upon the economic impact of their combined or independent charging requirements as defined against their total Power Required and referenced against prevailing TOU charges f{time of day, specific day, other associated details} to establish a defined, operational ROI/NPV/financial target and cost mitigation. Alternatively, or concurrently, the BESS 20 may augment charging during these scenarios.

Figure 3B:
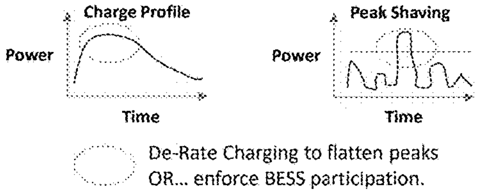
FIG. 3*b* illustrates periods of de-rated charging, or enforced BESS participation, to adapt to a peak shaving local utility rate plan.

FIG. 3*b* illustrates periods of de-rated charging, or enforced BESS 20 participation, to adapt to a peak shaving local utility rate plan. For this scenario, the Energy Management System is coupled with trended power usage in Data Cloud. Within a specific % de-rate(s) band for individual electrical load charging profiles, the EMS may instruct individual or all electrical loads, based upon their independent charging profiles, to de-rate their Power Required based upon the economic impact of their combined or independent charging requirements as defined against their total Power Required and referenced against trended power consumption f{time, trended totals, other associated details} to establish a defined, operational ROI/NPV/financial target and cost mitigation. Alternatively, or concurrently, the BESS 20 may augment charging during these scenarios.

In the case of a bi-directional utility rate plan in which energy may be returned to the utility for credit. Then in those cases where Power Required=0, Power Delivered=0 and Power Supplied=0, opportunities may exist for the BESS 20 to "sell back" energy from the Battery Energy Storage system 20 during high TOU use conditions and increase the ROI/NPV/Financial targets for a particular installation.

Figure 4A:
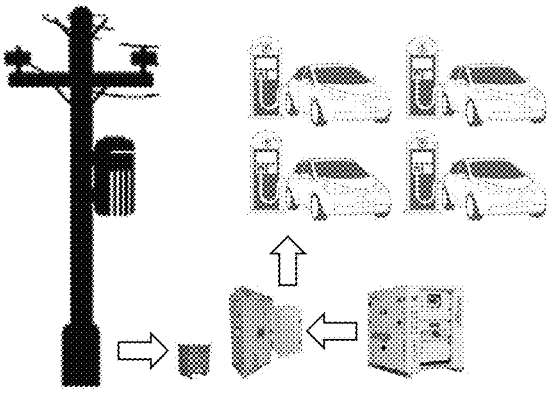
FIGS. 4*a* and 4*b* illustrate fixed-location and mobile deployment options for the modules shown in FIG. 2 et seq., which may be used for various particular market applications.
Figure 4B:
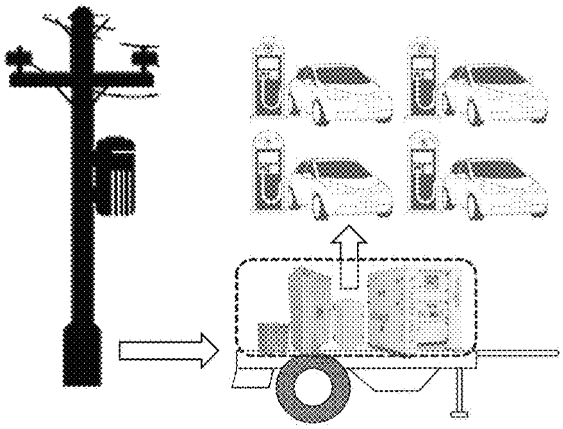

FIG. 4*a* illustrates a fixed-location option and FIG. 4*b* illustrates a mobile deployment option for the modules shown in FIG. 2 et seq. Various markets and applications can be applicable to either fixed-location and mobile deployment options.

Markets & Applications for a fixed installation include Farming: irrigation, in-field power applications; Electric Vehicles: dealerships, convenience stores, service centers, highway corridors, airports (cars or aircraft), fast food; Telecommunications: base stations, networking hubs, fiber co-locations; Entertainment: entertainment venues, sporting venues and fields, recreational parks; Travel: hotels, motels, hostels, camping grounds, national parks; Other: manufacturing centers, pumping stations, other power needs in single phase service areas.

Markets & Applications for a mobile installation include Farming: mobile irrigation and in-field power applications; Electric Vehicles: mobile service centers, temporary logistics hubs; Telecommunications: mobile satellite systems, mobile telecommunications base stations; Entertainment: mobile lighting, mobile amusement; Travel: temporary shelters, temporary housing, FEMA locations; Security: military bases, emergency monitoring & lighting, forward field; Other: other power needs in single phase service areas which may be temporary, transitory, or in-process for further three phase build-out.

Those of ordinary skill in the art will appreciate that there may be various manners of providing vehicle charging from single phase electrical power. For instance, alternative electrical or mechanical systems than those disclosed herein may be implemented to transfer energy from a single phase to a multi-phase format for delivery to a DC fast charger. Furthermore, energy storage for a DC fast charger may be incorporated within the charger rather than be provided separately as disclosed herein, in which case the controller disclosed herein may interact with the DC fast charger to determine the necessity for delivering high capacity three phase power to allow for energy storage. Moreover, the multi-phase format delivered to the DC fast charger may utilize two phases spaced at 180 degrees, four phases spaced at 90 degrees or a higher number of phases, or phases spaced unequally, without variance from the inventive principles described herein. Various other modifications may be made to the illustrated embodiments without departing from the spirit and scope of the invention. Therefore, the invention lies in the claims hereinafter appended.

What is claimed is:

1. A power conversion system for supplying multi-phase electrical power to an electrical load, comprising:

a. a utility service connection providing single phase electrical power;

b. a conditioning system coupled to said utility service connection for providing multi-phase power comprising a plurality of AC phases, wherein one of said AC phases is synthesized from direct current power derived from said single-phase electrical power, and wherein at least one other of said AC phases is derived from said single-phase electrical power passed through a high-capacity converter without being synthesized;

c. an energy storage device and corresponding bi-directional charge controller; and d. a utility power interface coupled to an electrical load, conditioning system, and energy storage device, controlling said conditioning system for delivery of power required by the electrical load, and coupled to said energy storage device and controlling the conditioning system to store energy in the energy storage device, or to augment the power output of said conditioning system by drawing stored energy from the energy storage device;

the utility power interface controlling energy flow between the conditioning system, energy storage device and electrical load based on the sufficiency of the utility power source, charge level of the energy storage device, demand from the electrical load, and economic factors relating to the utility power source.

2. The system of claim 1, wherein the electrical load is an electric vehicle rapid charging station.

3. The system of claim 1, wherein the utility power interface operates in a sufficient power state, in which energy is provided from the conditioning system to the electrical load, and when the energy storage device is discharged below a threshold, energy is also provided to the energy storage device.

4. The system of claim 1, wherein the utility power interface operates in an insufficient power state, in which energy is provided from the conditioning system and the energy storage device to the electrical load, and when the energy storage device is discharged below a threshold, the electrical load is caused to de-rate its requirements such that the power available from the conditioning system is sufficient to supply the electrical load.

5. The system of claim 1, wherein the utility power interface operates in a time of use mode, in which, during high cost time of use periods, power obtained from the conditioning system is reduced, and energy is provided from the conditioning system and the energy storage device to the electrical load, and when the energy storage device is discharged below a threshold, the electrical load is caused to de-rate its requirements such that the reduced power from the conditioning system is sufficient to supply the electrical load.

6. The system of claim 1, wherein the utility power interface operates in a peak shaving mode, in which, during periods of peak power consumption, the power obtained from the conditioning system is reduced, and energy is provided from the conditioning system and the energy storage device to the electrical load, and when the energy storage device is discharged below a threshold, the electrical load is caused to de-rate its requirements such that the reduced power from the conditioning system is sufficient to supply the electrical load.

7. The system of claim 1, wherein the utility power interface operates in a bi-directional mode, in which, during periods when return of power to a power utility is economically advantageous, energy is provided from the conditioning system and delivered through the conditioning system to the power utility.

* * * * *